US009947081B2

(12) United States Patent
Minami et al.

(10) Patent No.: US 9,947,081 B2
(45) Date of Patent: Apr. 17, 2018

(54) DISPLAY CONTROL SYSTEM AND DISPLAY CONTROL METHOD

(71) Applicant: Mitsubishi Electric Corporation, Tokyo (JP)

(72) Inventors: Saki Minami, Tokyo (JP); Hiroki Ebina, Tokyo (JP); Mitsuo Shimotani, Tokyo (JP); Yasuaki Hidaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/303,430

(22) PCT Filed: Jun. 11, 2014

(86) PCT No.: PCT/JP2014/065410
§ 371 (c)(1),
(2) Date: Oct. 11, 2016

(87) PCT Pub. No.: WO2015/189922
PCT Pub. Date: Dec. 17, 2015

(65) Prior Publication Data
US 2017/0032496 A1 Feb. 2, 2017

(51) Int. Cl.
*G06T 3/60* (2006.01)
*G06F 3/0488* (2013.01)
(Continued)

(52) U.S. Cl.
CPC ............... *G06T 3/60* (2013.01); *G06F 3/048* (2013.01); *G06F 3/0488* (2013.01); *G06T 11/206* (2013.01); *G06F 3/04845* (2013.01)

(58) Field of Classification Search
CPC ...... G06F 3/0416; G06F 3/048; G06F 3/0488; H04N 5/23216; H04N 1/00411; G06T 11/206; G06T 3/60
See application file for complete search history.

(56) References Cited

U.S. PATENT DOCUMENTS 5,300,927 A * 4/1994 Arai ................... G06F 3/04845
345/157
7,015,894 B2 * 3/2006 Morohoshi ......... G06F 3/03545
345/156
(Continued)

FOREIGN PATENT DOCUMENTS

CN 2000-1630310 A 6/2000
CN 1591514 A 3/2005
(Continued)

OTHER PUBLICATIONS

Chinese Office Action dated May 16, 2017 in Chinese counterpart Application No. 2014800796902 with an English Translation.
(Continued)

*Primary Examiner* — Robert Craddock
(74) *Attorney, Agent, or Firm* — Birch, Stewart, Kolasch & Birch, LLP

(57) ABSTRACT

An object of the present invention is to provide a display control system and a display control method which can rotate information displayed on a display screen as intended by a user by performing one rotating operation. A display control system according to the present invention includes: a rotating operation deciding unit which decides whether or not a rotating operation of rotating information in a state where two points are placed in touch with the information displayed on a display screen has been performed; and a display controller which, when the rotating operation deciding unit determines that the rotating operation has been performed, and when a speed of the rotation is a first threshold or more, controls to rotate the information more greatly than actual rotation performed by the rotating operation and to display the information on the display screen.

12 Claims, 6 Drawing Sheets

(51) Int. Cl.
*G06F 3/048* (2013.01)
*G06T 11/20* (2006.01)
*G06F 3/0484* (2013.01)

(56) References Cited

U.S. PATENT DOCUMENTS

| | | |
|---|---|---|
| 7,304,653 B2 | 12/2007 | Ueno |
| 8,462,132 B2 | 6/2013 | Ren et al. |
| 2005/0052413 A1 | 3/2005 | Ueno |
| 2006/0026521 A1* | 2/2006 | Hotelling ............... G06F 3/0418 715/702 |
| 2007/0152981 A1* | 7/2007 | Im ....................... G06F 3/03547 345/173 |
| 2011/0074828 A1 | 3/2011 | Capela et al. |
| 2011/0219302 A1* | 9/2011 | Kondo .................. G06F 3/0416 715/702 |
| 2012/0200604 A1 | 8/2012 | Imaeda et al. |
| 2013/0326425 A1 | 12/2013 | Forstall et al. |
| 2014/0009415 A1* | 1/2014 | Nishida ............... G06F 3/04886 345/173 |

FOREIGN PATENT DOCUMENTS

| | | |
|---|---|---|
| CN | 2008-158842 A | 7/2008 |
| CN | 102023788 A | 4/2011 |
| CN | 103365595 A | 10/2013 |
| CN | 3 121 697 A1 | 1/2017 |
| JP | 2000-163031 A | 6/2000 |
| JP | 2010-113608 A | 5/2010 |
| JP | 2011-3074 A | 1/2011 |
| JP | 2013-533550 A | 8/2013 |
| WO | WO 2011/045861 A1 | 4/2011 |

OTHER PUBLICATIONS

Office Action dated Jul. 25, 2017 in the counterpart German Application No. 11 2014 006 739.3 with an English Translation.

* cited by examiner

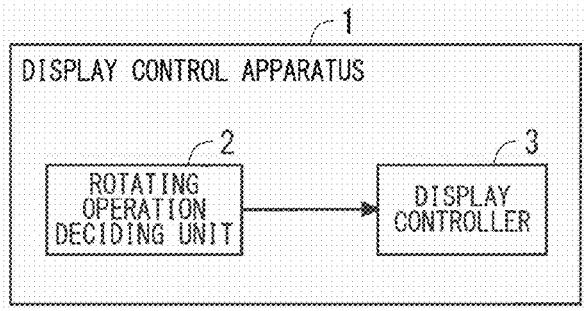
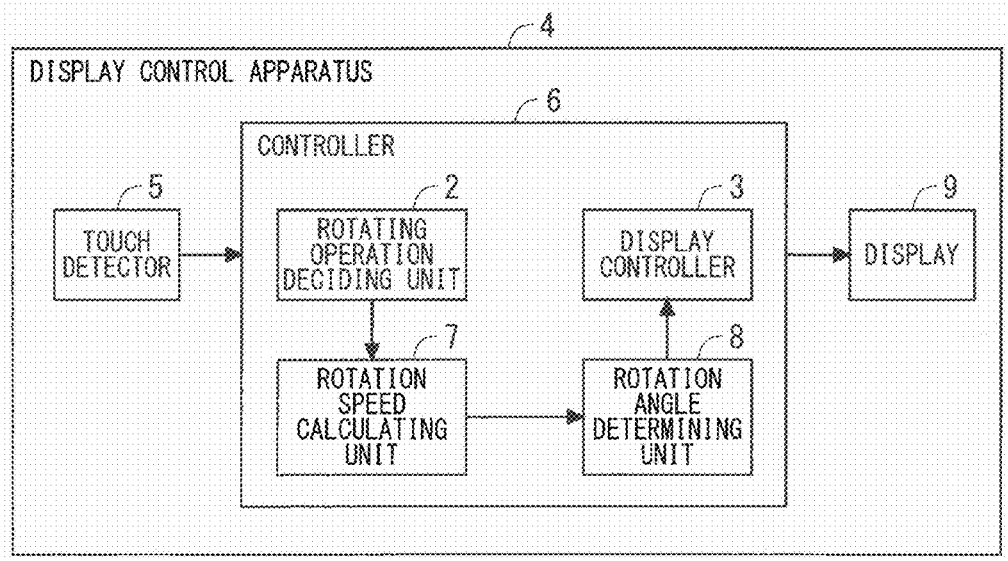

DISPLAY CONTROL SYSTEM AND DISPLAY CONTROL METHOD

TECHNICAL FIELD

The present invention relates to a display control system and a display control method which perform display control to rotate information displayed on a display screen.

BACKGROUND ART

Conventionally, there has been a technique of rotating an image or information such as a map displayed on a display screen by a user's touch operation. However, there is a problem that, when an angle to rotate information is great (e.g. the information is rotated 180 degrees), a user has difficulty in performing a rotating operation.

As a measure for such a problem, for example, a technique of rotating a map or the like in a state where a user touches (is in touch with) two points on a display screen, and then continues the rotating operation by using only one point while leaving the other one point of the two points is disclosed (see, for example, Patent Document 1).

Furthermore, a technique of, when a user rotates a map in a state where the user touches two points on a display screen, rotating the map at a rate corresponding to a moving distance of a finger is disclosed (see, for example, Patent Document 2).

PRIOR ART DOCUMENTS

Patent Documents

Patent Document 1: International Publication No. 2011/045861
Patent Document 2: Japanese Patent Application Laid-Open No. 2000-163031

SUMMARY OF INVENTION

Problems to be Solved by the Invention

There may be a case where, when rotating information displayed on a display screen, the user wishes to rotate information following an actual rotating operation by performing one rotating operation or to rotate information at an angle greater than that of an actual rotating operation.

However, according to Patent Documents 1 and 2, it is not possible to rotate information following an actual rotating operation by performing one rotating operation or rotate information at an angle greater than that of an actual rotating operation. According to Patent Document 1 in particular, it is necessary to perform a rotating operation in a state where two points are touched, and then perform a rotating operation in a state where one point is touched to continue the rotating operation, and the number of times of operations and an operation time are large and long and cause ineffectiveness.

Thus, according to Patent Documents 1 and 2, information displayed on a display screen is not necessarily rotated as intended by a user by performing one rotating operation.

The present invention has been made to solve such a problem, and an object of the present invention is to provide a display control system and a display control method which can rotate information displayed on a display screen as intended by a user by performing one rotating operation.

Means for Solving the Problems

To solve the above problem, a display control system according to the present invention includes: a processor to execute a program; and a memory to store the program which, when executed by the processor, performs processes of, deciding whether or not a rotating operation of rotating information in a state where two points are placed in touch with the information displayed on a display screen has been performed; and when it is decided that the rotating operation has been performed, and when a speed of the rotation is a first threshold or more, controlling to rotate the information more greatly than actual rotation performed by the rotating operation and to display the information on the display screen.

Furthermore, a display control system according to the present invention includes: a processor to execute a program; and a memory to store the program which, when executed by the processor, performs processes of, deciding whether or not a rotating operation of rotating information in a state where two points are placed in touch with the information displayed on a display screen has been performed; and when it is decided that the rotating operation has been performed, and when a distance between the two points is a second threshold or more, controlling to rotate the information more greatly than actual rotation performed by the rotating operation and to display the information on the display screen.

Furthermore, a display control method according to the present invention includes: deciding whether or not a rotating operation of rotating information has been performed in a state where two points are placed in touch with the information displayed on a display screen; and when it is decided that the rotating operation has been performed, and when a speed of the rotation is a first threshold or more, controlling to rotate the information more greatly than actual rotation performed by the rotating operation and to display the information on the display screen.

Still further, a display control method according to the present invention includes: deciding whether or not a rotating operation of rotating information in a state where two points are placed in touch with the information displayed on a display screen has been performed; and when it is decided that the rotating operation has been performed, and when a distance between the two points is a second threshold or more, controlling to rotate the information more greatly than actual rotation performed by the rotating operation and to display the information on the display screen.

Effects of the Invention

According to the present invention, the display control system includes: a processor to execute a program; and a memory to store the program which, when executed by the processor, performs processes of, deciding whether or not a rotating operation of rotating information in a state where two points are placed in touch with the information displayed on a display screen has been performed; and when it is decided that the rotating operation has been performed, and when a speed of the rotation is a first threshold or more, controlling to rotate the information more greatly than actual rotation performed by the rotating operation and to display the information on the display screen. Consequently, it is possible to rotate the information displayed on the display screen as intended by a user by performing one rotating operation.

Furthermore, the display control system includes: a processor to execute a program; and a memory to store the program which, when executed by the processor, performs processes of, deciding whether or not a rotating operation of rotating information in a state where two points are placed in touch with the information displayed on a display screen has been performed; and when it is decided that the rotating operation has been performed, and when a distance between the two points is a second threshold or more, controlling to rotate the information more greatly than actual rotation performed by the rotating operation and to display the information on the display screen. Consequently, it is possible to rotate the information displayed on the display screen as intended by a user by performing one rotating operation.

Furthermore, the display control method includes: deciding whether or not a rotating operation of rotating information in a state where two points are placed in touch with the information displayed on a display screen has been performed; and when it is decided that the rotating operation has been performed, and when a speed of the rotation is a first threshold or more, controlling to rotate the information more greatly than actual rotation performed by the rotating operation and to display the information on the display screen. Consequently, it is possible to rotate the information displayed on the display screen as intended by a user by performing one rotating operation.

Furthermore, the display control method includes: deciding whether or not a rotating operation of rotating information in a state where two points are placed in touch with the information displayed on a display screen has been performed; and when it is decided that the rotating operation has been performed, and when a distance between the two points is a second threshold or more, controlling to rotate the information more greatly than actual rotation performed by the rotating operation and to display the information on the display screen. Consequently, it is possible to rotate the information displayed on the display screen as intended by a user by performing one rotating operation.

Objects, features, aspects and advantages of the present invention will be more apparent from the following detailed description and the accompanying drawings.

BRIEF DESCRIPTION OF DRAWINGS

FIG. 1 is a block diagram illustrating an example of a configuration of a display control apparatus according to a first embodiment of the present invention.

FIG. 2 is a block diagram illustrating another example of a configuration of the display control apparatus according to the first embodiment of the present invention.

DESCRIPTION OF EMBODIMENTS

Figure 3:
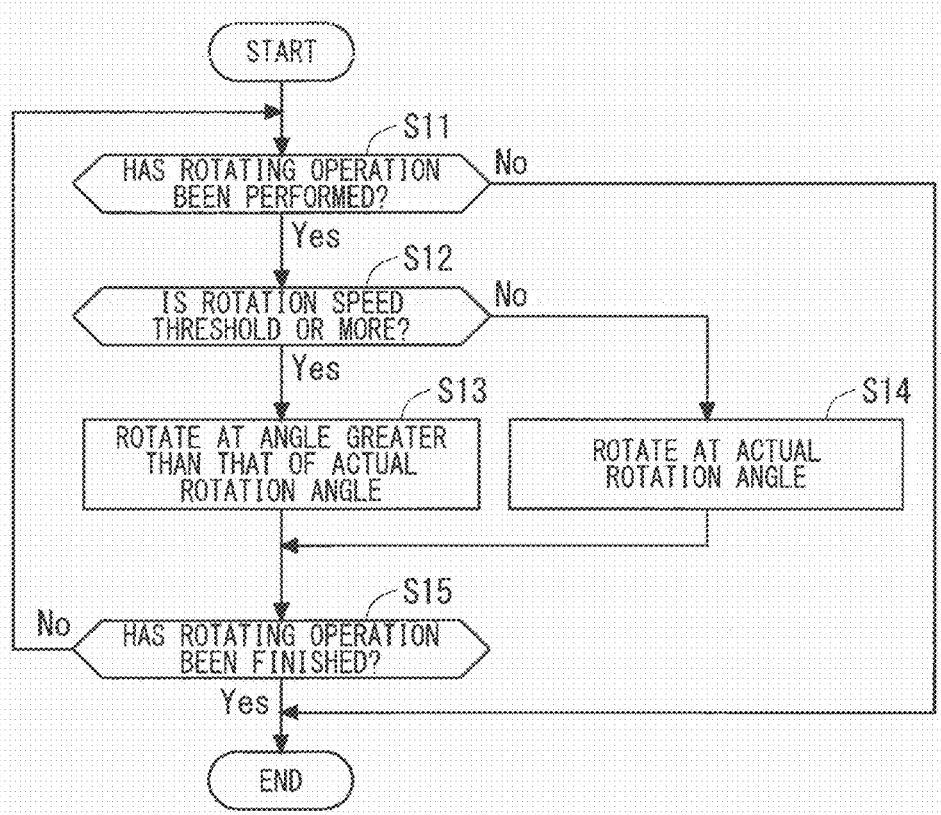
FIG. 3 is a flowchart illustrating an example of an operation of the display control apparatus according to the first embodiment of the present invention.

The embodiments of the present invention will be described below with reference to the drawings.
<First Embodiment>
First, a configuration of a display control system according to the first embodiment of the present invention will be described. In addition, a case where the display control system is realized by a display control apparatus alone will be described in the present embodiment and each of the following embodiments.

FIG. 1 is a block diagram illustrating the example of the configuration of the display control apparatus according to the first embodiment. In addition, FIG. 1 illustrates minimum necessary components which configure a display control apparatus 1.

As illustrated in FIG. 1, the display control apparatus 1 includes at least a rotating operation deciding unit 2 and a display controller 3.

The rotating operation deciding unit 2 decides whether or not a user has performed on information displayed on a display screen (e.g. a display 9 in FIG. 2 described below) a rotating operation of rotating the information in a state where the user touches two points.

When the rotating operation deciding unit 2 decides that the rotating operation has been performed, and when a speed of the rotation is a first threshold or more, the display controller 3 controls to rotate the information more greatly than actual rotation performed by the rotating operation and to display the information on the display screen.

Next, other components of the display control apparatus 1 including the rotating operation deciding unit 2 and the display controller 3 will be described.

FIG. 2 is a block diagram illustrating an example of a configuration of a display control apparatus 4.

As illustrated in FIG. 2, the display control apparatus 4 includes a touch detector 5, a controller 6 and the display 9. Furthermore, the controller 6 includes a rotating operation deciding unit 2, the display controller 3, a rotation speed calculating unit 7 and a rotation angle determining unit 8.

The touch detector 5 is configured as a touch panel, for example, and detects that a user has touched a touch panel. In addition, the touch panel may be touched by a user's finger, a touch pen or the like.

When the touch detector 5 detects the user's touch, the rotating operation deciding unit 2 decides whether or not the user has performed the rotating operation in a state where the user touches two points on the touch panel.

When the rotating operation deciding unit 2 decides that the rotating operation has been performed, the rotation speed calculating unit 7 calculates a rotation speed of the rotating operation. In this regard, the rotation speed can be calculated as, for example, an average speed (angular speed) per unit time.

The rotation angle determining unit 8 determines a rotation angle of information displayed on the display 9 based on the rotation speed calculated by the rotation speed calculating unit 7.

The display controller 3 controls to display the information on the display 9 at the rotation angle determined by the rotation angle determining unit 8.

The display 9 is configured as a liquid crystal display device, for example, and displays information under display control of the display controller 3.

In addition, the touch detector 5 and the display 9 may be integrally formed or may be individually provided.

Next, an operation of the display control apparatus 4 will be described.

Figure 4:
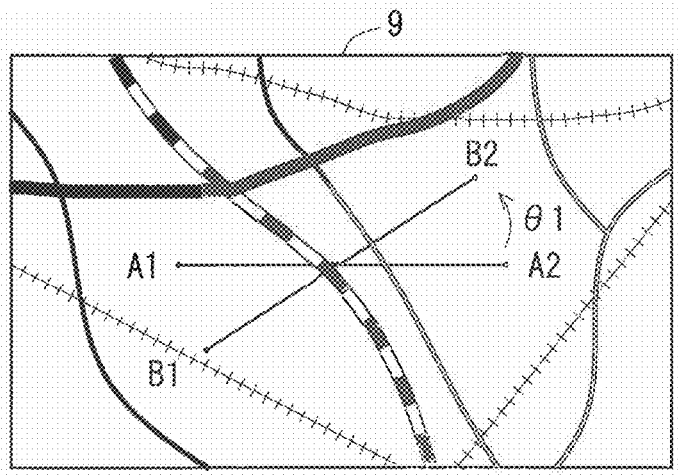
FIG. 4 is a view illustrating an example of a rotating operation according to the first embodiment of the present invention.

FIG. 3 is a flowchart illustrating an example of the operation of the display control apparatus 4. Furthermore, FIG. 4 is a view illustrating an example of a rotating operation. Hereinafter, a case where, as illustrated in FIG. 4, the user moves map (information) to positions B1 and B2 by an angle θ1 in a state where the user touches two points A1 and A2 (in this case, a center point of rotation may be a center of a line segment connecting A1 and A2).

In step S11, the rotating operation deciding unit 2 decides whether or not the user has performed the rotating operation. More specifically, the rotating operation deciding unit 2 decides whether or not the user has performed the rotating operation in a state where the user touches two points on the touch panel, based on a detection result of the touch detector 5. When it is decided that the rotating operation has been performed, the flow moves to step S12. Meanwhile, when it is decided that the rotating operation has not been performed, processing is finished.

In step S12, the rotation angle determining unit 8 decides whether or not the rotation speed calculated by the rotation speed calculating unit 7 is a threshold (first threshold) or more. When it is decided that the rotation speed is the threshold or more, the flow moves to step S13. Meanwhile, when it is decided that the rotation speed is not the threshold or more (the rotation speed is less than the threshold), the flow moves to step S14.

In step S13, the rotation angle determining unit 8 determines an angle greater than an angle (the θ1 in FIG. 4) of actual rotation performed by the user's rotating operation, as a rotation angle for rotating the map. The display 9 displays the map rotated at the rotation angle determined by the rotation angle determining unit 8 under display control of the display controller 3.

In step S14, the rotation angle determining unit 8 determines the angle of the actual rotation performed by the user's rotating operation, as a rotation angle for rotating the map. The display 9 displays the map rotated at the rotation angle determined by the rotation angle determining unit 8 under display control of the display controller 3.

In step S15, the rotating operation deciding unit 2 decides whether or not the user has finished the rotating operation. More specifically, the rotating operation deciding unit 2 may decide that the rotating operation has been finished when, for example, a rotating operation of rotating the map to the positions B1 and B2 illustrated in FIG. 4 is performed and then a touched state of the two points is released (for example, two fingers are moved away from the touch panel). When it is decided that the rotating operation has not been finished, processing is finished. Meanwhile, when it is decided that the rotating operation has not been finished, the flow moves to step S11.

In addition, for example, the rotating operation deciding unit 2 may calculate an angle of actual rotation performed by a user's rotating operation.

Next, a method for determining a rotation angle in the rotation angle determining unit 8 in step S13 and step S14 in FIG. 3 will be described.

Figure 5:
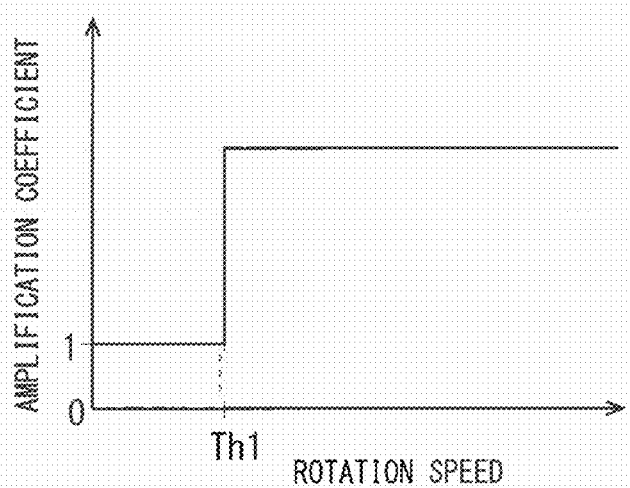
FIG. 5 is a view illustrating an example of a relationship between a rotation speed and an amplification coefficient according to the first embodiment of the present invention.

FIG. 5 is a view illustrating an example of a relationship between a rotation speed and an amplification coefficient. In FIG. 5, a horizontal axis indicates a rotation speed calculated by the rotation speed calculating unit 7, and a vertical axis indicates an amplification coefficient. In this regard, the amplification coefficient refers to the degree of amplification indicating to what degree an angle is amplified compared to an angle of actual rotation performed by a user's rotating operation.

When, as illustrated in FIG. 5, the rotation speed calculated by the rotation speed calculating unit 7 is a threshold (Th1) or more (step S13 in FIG. 3), the rotation angle determining unit 8 determines a rotation angle by multiplying the angle of the actual rotation performed by the user's rotating operation by an amplification coefficient larger than one. In this case, the amplification coefficient increases at a fixed rate compared to actual rotation. According to this determination, the display controller 3 controls to rotate information (e.g. map) more greatly than actual rotation, and to display the information on the display 9.

Meanwhile, when the rotation speed calculated by the rotation speed calculating unit 7 is less than a threshold (Th1) (step S14 in FIG. 3), the rotation angle determining unit 8 determines a rotation angle by multiplying the angle of the actual rotation performed by the user's rotating operation by an amplification coefficient of one. According to this determination, the display controller 3 controls to rotate information following actual rotation, and to display the information on the display 9.

In addition, a case where, when a rotation speed is a threshold (Th1) or more, a rotation angle is increased at a fixed rate compared to actual rotation (see FIG. 5) has been described as an example with reference to above FIG. 3. However, the present invention is not limited to this. When, for example, a rotation speed is a threshold or more (in step S13 in FIG. 3), a rotation angle may be increased compared to actual rotation based on one of FIGS. 6 to 8.

Figure 6:
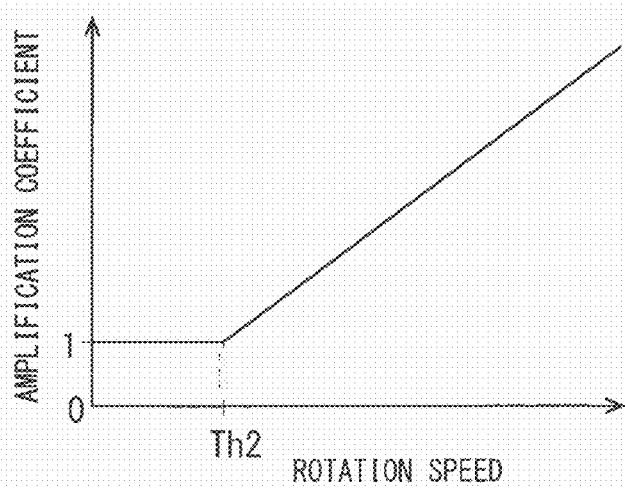
FIG. 6 is a view illustrating another example of a relationship between a rotation speed and an amplification coefficient according to the first embodiment of the present invention.
Figure 7:
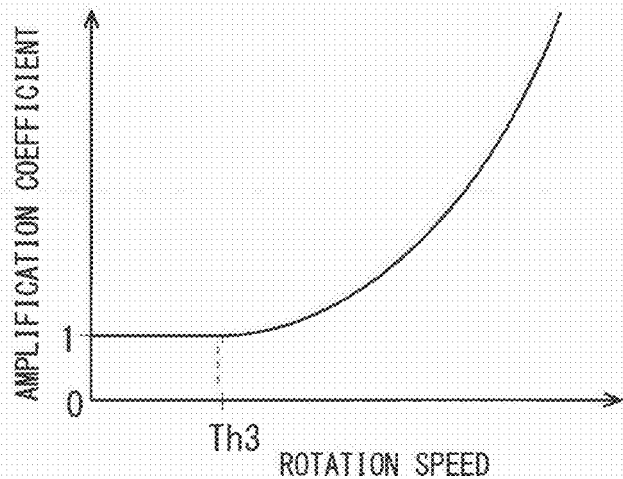
FIG. 7 is a view illustrating another example of a relationship between a rotation speed and an amplification coefficient according to the first embodiment of the present invention.
Figure 8:
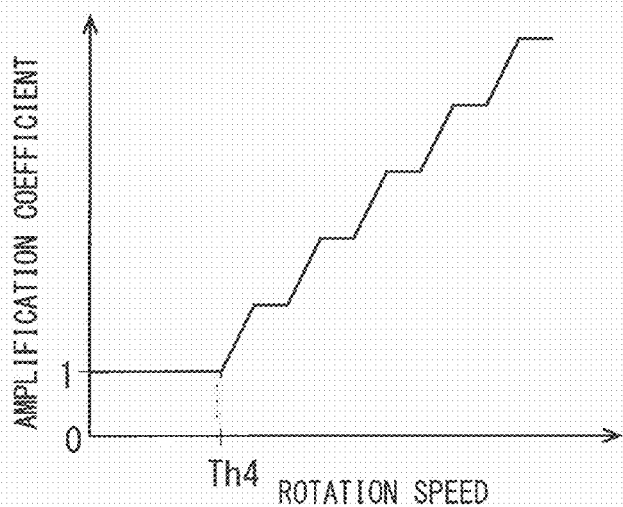
FIG. 8 is a view illustrating another example of a relationship between a rotation speed and an amplification coefficient according to the first embodiment of the present invention.

FIGS. 6 to 8 are views illustrating examples of a relationship between a rotation speed and an amplification coefficient. In FIGS. 6 to 8, a horizontal axis indicates a rotation speed calculated by the rotation speed calculating unit 7, and a vertical axis indicates an amplification coefficient. In addition, in FIGS. 6 to 8, when the rotation speed is less than thresholds (Th2, Th3 and Th4), the rotation speed is the same as that in FIG. 5, and therefore will not be described below.

When, as illustrated in FIG. 6, the rotation speed calculated by the rotation speed calculating unit 7 is a threshold (Th2) or more, the rotation angle determining unit 8 determines a rotation angle by multiplying the angle of the actual rotation performed by the user's rotating operation by an amplification coefficient larger than one. In this case, the amplification coefficient increases in proportion to the rotation speed. According to this determination, the display controller 3 controls to rotate information more greatly than actual rotation, and to display the information on the display 9.

When, as illustrated in FIG. 7, the rotation speed calculated by the rotation speed calculating unit 7 is a threshold (Th3) or more, the rotation angle determining unit 8 determines a rotation angle by multiplying the angle of the actual rotation performed by the user's rotating operation by an amplification coefficient larger than one. In this case, the amplification coefficient expotentially increases according to the rotation speed. According to this determination, the display controller 3 controls to rotate information more greatly than actual rotation, and to display the information on the display 9.

When, as illustrated in FIG. 8, the rotation speed calculated by the rotation speed calculating unit 7 is a threshold (Th4) or more, the rotation angle determining unit 8 determines a rotation angle by multiplying the angle of the actual rotation performed by the user's rotating operation by an amplification coefficient larger than one. In this case, the amplification coefficient increases stepwise according to the rotation speed.

According to this determination, the display controller 3 controls to rotate information more greatly than actual rotation, and to display the information on the display 9.

In view of the above, according to the first embodiment, it is possible to rotate the information displayed on the display screen as intended by the user by performing one rotating operation.

In addition, a case where, as illustrated in FIG. 4, a rotating operation is simultaneously performed on touched two points has been described above. However, the present invention is not limited to this. For example, in FIG. 4, one of the points A1 and A2 may be fixed as a center point, and a rotating operation may be performed on the other point.

<Second Embodiment>

First, a configuration of a display control apparatus according to the second embodiment of the present invention will be described.

Figure 9:
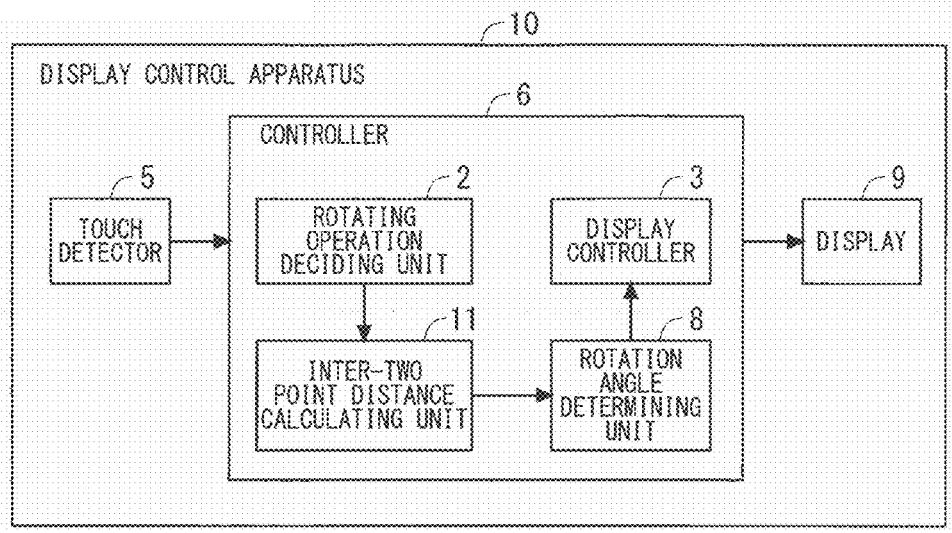
FIG. 9 is a block diagram illustrating an example of a configuration of a display control apparatus according to a second embodiment of the present invention.

FIG. 9 is a block diagram illustrating the example of the configuration of a display control apparatus 10 according to the second embodiment.

As illustrated in 9, features of the display control apparatus 10 according to the second embodiment include an inter-two point distance calculating unit 11 instead of a rotation speed calculating unit 7 of a display control apparatus 4 according to the first embodiment. Other components and operations are the same as those in the first embodiment and therefore will not be described hereinafter.

When a rotating operation deciding unit 2 decides that a rotating operation has been performed, the inter-two point distance calculating unit 11 calculates a distance between two points based on each position information of the two points touched by a user on a touch panel and detected by a touch detector 5.

A rotation angle determining unit 8 determines a rotation angle of information displayed on a display 9 based on the distance between the two points calculated by the inter-two point distance calculating unit 11.

The display controller 3 controls to display the information on the display 9 at the rotation angle determined by the rotation angle determining unit 8.

Next, an operation of the display control apparatus 10 will be described.

Figure 10:
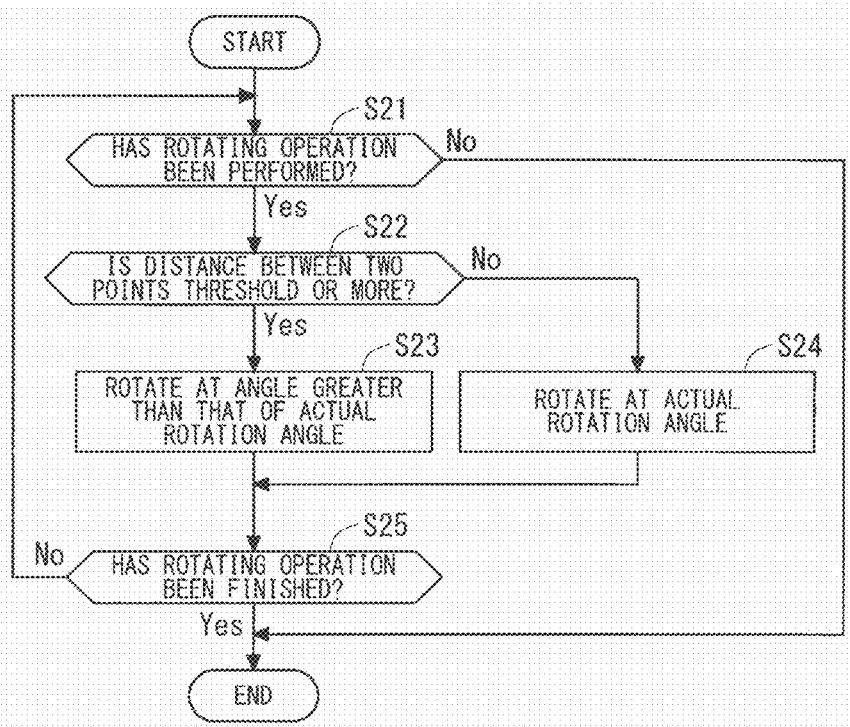
FIG. 10 is a flowchart illustrating an example of an operation of the display control apparatus according to the second embodiment of the present invention.

FIG. 10 is a flowchart illustrating an example of the operation of the display control apparatus 10. In addition, step S21, and step S23 to step S25 in FIG. 10 correspond to step S11 and step S13 to step S15 in FIG. 3, and therefore will not be described. That is, in step S23, one of FIGS. 5 to 8 is applicable. In this case, a "rotation speed" which is a rotation axis in FIGS. 5 to 8 needs to be read as "a distance between two points".

In step S22, the rotation angle determining unit 8 decides whether or not the distance between the two points calculated by the inter-two point distance calculating unit 11 is a threshold (second threshold) or more. When it is decided that the distance between the two points is the threshold or more, the flow moves to step S23. Meanwhile, when the distance between the two points is not the threshold or more (the distance between the two points is less than the threshold), the flow moves to step S24.

In view of the above, according to the second embodiment, it is possible to rotate the information displayed on the display screen as intended by the user by performing one rotating operation.

<Third Embodiment>

Features of the third embodiment include combining the first embodiment and the second embodiment. A configuration and an operation of a display control apparatus according to the third embodiment are the same as those of a display control apparatus 4 according to the first embodiment (see FIG. 2) and a display control apparatus 10 according to the second embodiment (see FIG. 9), and therefore will not be described hereinafter.

A rotation angle determining unit 8 determines a rotation angle of information displayed on a display 9 based on a rotation speed calculated by a rotation speed calculating unit 7 and a distance between the two points calculated by an inter-two point distance calculating unit 11. In addition, a method for determining a rotation angle is the same as those of the first and second embodiments.

More specifically, when a rotation speed is a threshold (first threshold) or more and a distance between two points is a threshold (second threshold) or more, the rotation angle determining unit 8 determines a rotation angle by taking into account an amplification coefficient related to the rotation angle and an amplification coefficient related to the distance between the two points.

Furthermore, when the rotation speed is the threshold or more and the distance between the two points is less than the threshold, the rotation angle determining unit 8 determines a rotation angle by taking into account an amplification coefficient related to the rotation angle.

Furthermore, when the rotation speed is less than the threshold and the distance between the two points is the threshold or more, the rotation angle determining unit 8 determines a rotation angle by taking into account an amplification coefficient related to the distance between the two points.

Still further, when the rotation speed is less than the threshold and the distance between two points is less than the threshold, the rotation angle determining unit 8 determines the angle of the actual rotation performed by the user's rotating operation, as a rotation angle for rotating a map.

In view of the above, according to the third embodiment, it is possible to rotate information displayed on a display screen as intended by the user by performing one rotating operation similar to the first and second embodiments.

The above-described display control apparatus is applicable not only to in-vehicle navigation devices, i.e., car navigation devices, but also to Portable Navigation Device (PNDs) which can be mounted on vehicles and mobile communication terminals (e.g. mobile telephones, smartphones and tablet terminals), and navigation devices which are optionally combined with serves and are constructed as systems or devices other than the navigation devices. In this case, each function and each component of the display control apparatus are provided as a dispersed arrangement to each function which constructs the above system.

Figure 11:
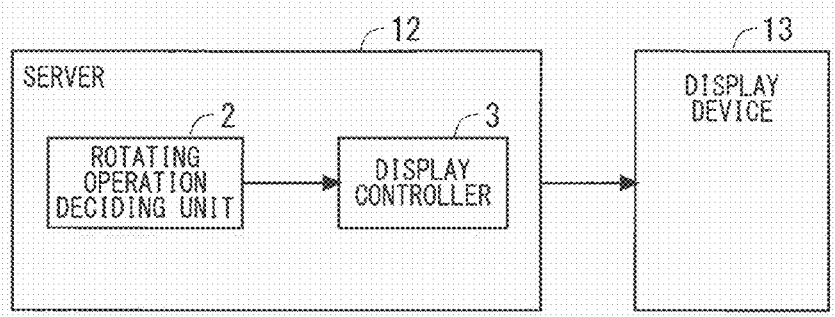
FIG. 11 is a block diagram illustrating an example of a configuration of a display control system according to the embodiment of the present invention.

More specifically, according to one example, the functions of the display control apparatus can be implemented on a server. As illustrated in, for example, FIG. 11, it is possible to construct a display control system by providing a display device 13 at a user side, and providing a rotating operation deciding unit 2 and a display controller 3 in a server 12. In addition, functions of the rotating operation deciding unit 2 and the display controller 3 are the same as functions of the rotating operation deciding unit 2 and the display controller 3 in FIG. 1. Furthermore, the server 12 may include each component as illustrated in FIGS. 2 and 9 when necessary. In this case, each component of the server 12 may be optionally provided in a dispersed arrangement in the server 12 and the display device 13.

Figure 12:
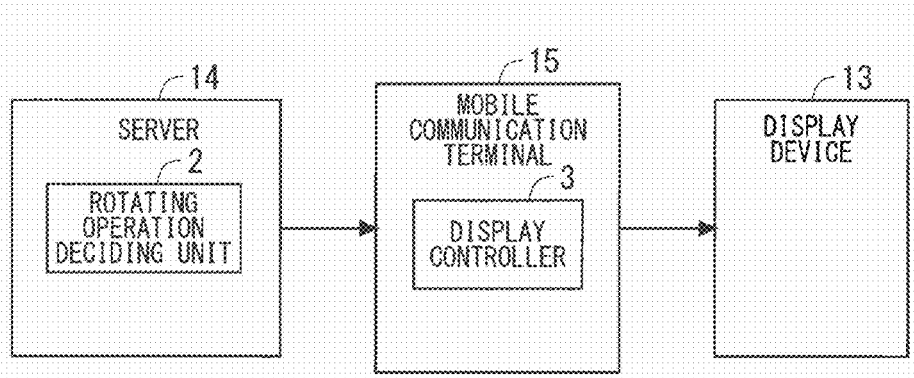
FIG. 12 is a block diagram illustrating another example of a configuration of a display control system according to the embodiment of the present invention.

Furthermore, according to another example, the functions of the display control apparatus can be implemented in a server and a mobile communication terminal. As illustrated in, for example, FIG. 12, it is possible to construct a display control system by providing the display device 13 at a user side, providing at least the rotating operation deciding unit 2 in a server 14 and providing at least the display controller 3 in a mobile communication terminal 15. In addition, functions of the rotating operation deciding unit 2 and the display controller 3 are the same as the functions of the rotating operation deciding unit 2 and the display controller 3 in FIG. 1. Furthermore, the server 14 and the mobile communication terminal 15 may include each component as illustrated in FIGS. 2 and 9 when necessary. In this case, each component of the server 14 and the mobile communication terminal 15 may be optionally provided in a dispersed arrangement in the display device 13, the server 14 and the mobile communication terminal 15.

In case of the above configuration, it is possible to provide the same effect as that of the above embodiments.

Furthermore, software (display control method) for executing the operation according to the above embodiments may be implemented in, for example, a server or a mobile communication terminal.

More specifically, according to one example, the above display control method includes: deciding whether or not a rotating operation of rotating information in a state where two points are placed in touch with the information displayed on a display screen has been performed; and when it is decided that the rotating operation has been performed, and when a speed of the rotation is a first threshold or more, performing control to rotate the information more greatly than actual rotation performed by the rotating operation and to display the information on the display screen.

Furthermore, according to another example, the above display control method includes: deciding whether or not a rotating operation of rotating information in a state where two points are placed in touch with the information displayed on a display screen has been performed; and when it is decided that the rotating operation has been performed, and when a distance between the two points is a second threshold or more, performing control to rotate the information more greatly than actual rotation performed by the rotating operation and to display the information on the display screen.

Furthermore, a display control method which is a combination of the above two display control methods may be provided.

In view of the above, by implementing in a server or a mobile communication terminal the software for executing the operation according to the above embodiments, and causing the server or the mobile communication terminal to operate, it is possible to provide the same effect as those of the above embodiments.

In addition, in FIGS. 1, 2, 9, 11 and 12, each of the rotating operation deciding unit 2, the display controller 3, a touch detector 5, the rotation speed calculating unit 7, the rotation angle determining unit 8 and an inter-two point distance calculating unit 11 is realized by executing program processing using a Central Processing Unit (CPU) based on software. Furthermore, if possible, each of the rotating operation deciding unit 2, the display controller 3, the touch detector 5, the rotation speed calculating unit 7, the rotation angle determining unit 8 and the inter-two point distance calculating unit 11 may be configured as hardware (e.g. an arithmetic operation/processing circuit configured to perform a specific arithmetic operation or processing on an electrical signal). Furthermore, both of the above may be mixed.

In addition, according to the present invention, each embodiment can be freely combined or each embodiment can be optionally deformed or omitted without departing form the spirit of the invention.

The present invention has been described in detail. However, the above description is exemplary in all aspects, and the present invention is not limited to this. It should be understood that an infinite number of modified examples which have not been exemplified are assumed without departing from the scope of the invention.

REFERENCE SIGNS LIST

1: display control apparatus
2: rotating operation deciding unit
3: display controller
4: display control apparatus
5: touch detector
6: controller
7: rotation speed calculating unit
8: rotation angle determining unit
9: display
10: display control apparatus
11: inter-two point distance calculating unit
12: server
13: display device
14: server
15: mobile communication terminal

The invention claimed is:

1. A display control system comprising:
a processor to execute a program; and
a memory to store the program which, when executed by the processor, performs processes of,
determining, based on a signal from a touch detector, whether a two touch point rotation operation for displayed information has been performed by a user; and
in response to a determination that a two touch point rotation operation has been performed,
determining a speed of rotation and rotation angle performed by the user;
rotating the displayed information by an amplified angle, where the amplified angle is calculated by multiplying the rotation angle performed by the user by a first amplification coefficient which varies according to the speed of rotation performed by the user, wherein when the speed of the rotation performed by the user is equal to or greater than a first threshold the first amplification coefficient is greater than one.

2. The display control system according to claim 1, wherein, when the speed of the rotation performed by the user is less than said first threshold, the first amplification coefficient is one.

3. The display control system according to claim 1, wherein, when the speed of the rotation performed by the user is equal to or greater than said first threshold, the first amplification coefficient changes with respect to the speed of rotation performed by the user causing an increase in the first amplification coefficient at a rate that is linearly proportional, exponentially proportional, or step-wise proportional to the speed of rotation performed by the user.

4. The display control system according to claim 1, further comprising:
 determining a distance between the two touch points of the rotation operation performed by the user;
 wherein the amplified angle is calculated by multiplying the first amplification coefficient and a second amplification coefficient which varies according to the distance between the two touch points.

5. The display control system according to claim 4, wherein, when the distance between said two touch points is equal to or greater than the second threshold the second amplification coefficient is greater than one.

6. The display control system according to claim 4, wherein, when the distance between said two touch points is less than said second threshold the second amplification coefficient is equal to one.

7. A display control system comprising:
 a processor to execute a program; and
 a memory to store the program which, when executed by the processor, performs processes of,
  determining, based on a signal from a touch detector, whether a two touch point rotation operation for displayed information has been performed; and
  in response to a determination that a two touch point rotation operation has been performed,
   determining a distance between the two touch points of the rotation operation and a rotation angle performed by the user;
   rotating the displayed information by an amplified angle, where the amplified angle is calculated by multiply the rotation angle performed by the user by a first amplification coefficient which varies according to the distance between the two touch points,
  wherein when the distance between said two touch points is equal to or greater than a first threshold the first amplification coefficient is greater than one.

8. The display control system according to claim 7, wherein, when the distance between said two touch points is less than said second threshold, the first amplification coefficient is equal to one.

9. The display control system according to claim 8, wherein, when the distance between said two touch points is equal to or greater than said first threshold, the first amplification coefficient changes with respect to the distance, causing an increase in the first application coefficient at a rate that is linearly proportional, exponentially proportional, or step-wise proportional to the distance between the two touch points.

10. A display control method comprising:
 determining, based on a signal from a touch detector, whether a two touch point rotation operation for displayed information has been performed by a user; and
 in response to a determination that a two touch point rotation operation has been performed,
  determining a speed of rotation and rotation angle performed by the user,
  rotating the displayed information by an amplified angle, where the amplified angle is calculated by multiplying the rotation angle performed by the user by a first amplification coefficient which varies according to the speed of rotation performed by the user,
 wherein when the speed of the rotation performed by the user is equal to or greater than a first threshold the amplification coefficient is greater than one.

11. The display control method according to claim 10, further comprising:
 determining a distance between the two touch points of the rotation operation performed by the user;
 calculating the amplified angle by multiplying the rotation angle performed by the user by the first amplification coefficient and a second amplification coefficient which varies according to the distance between the two touch points.

12. A display control method comprising:
 determining, based on a signal from a touch detector, whether a two touch point rotation operation for displayed information has been performed; and
 in response to a determination that a two touch point rotation operation has been performed
  determining a distance between the two touch points of the rotation operation and a rotation angle performed by the user;
  rotating the displayed information by an amplified angle, where the amplified angle is calculated by multiply the rotation angle performed by the user by a first amplification coefficient which varies according to the distance between the two touch points,
 wherein when the distance between said two touch points is equal to or greater than a first threshold, the first amplification coefficient is greater than one.

* * * * *